United States Patent
Schunder et al.

(10) Patent No.: US 11,518,241 B2
(45) Date of Patent: Dec. 6, 2022

(54) SYSTEMS AND METHODS FOR REGULATING CONTROL OF A VEHICLE INFOTAINMENT SYSTEM

(71) Applicant: FORD GLOBAL TECHNOLOGIES, LLC, Dearborn, MI (US)

(72) Inventors: Mark Schunder, Dearborn, MI (US); Julius Marchwicki, Detroit, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1619 days.

(21) Appl. No.: 15/423,175

(22) Filed: Feb. 2, 2017

(65) Prior Publication Data
US 2017/0147137 A1 May 25, 2017

Related U.S. Application Data

(63) Continuation of application No. 12/857,145, filed on Aug. 16, 2010, now abandoned.

(51) Int. Cl.
*B60K 28/06* (2006.01)
*B60K 35/00* (2006.01)
(Continued)

(52) U.S. Cl.
CPC ............... *B60K 28/06* (2013.01); *B60K 35/00* (2013.01); *B60K 37/06* (2013.01); *G06F 3/0362* (2013.01);
(Continued)

(58) Field of Classification Search
CPC .. G06F 3/0416; G06F 3/0484; G06F 3/04883; G06F 3/0362; B60K 35/00; B60K 37/06
(Continued)

(56) References Cited

U.S. PATENT DOCUMENTS 6,539,078 B1 3/2003 Hunt et al.
6,668,221 B2 12/2003 Harter, Jr. et al.
(Continued)

FOREIGN PATENT DOCUMENTS

JP 20070241122 9/2007
JP 26110088502 5/2011

OTHER PUBLICATIONS

Chinese Patent Office, Third Office Action for the corresponding Chinese Patent Application No. 201110221495.7, dated Jun. 27, 2016.
(Continued)

*Primary Examiner* — Thomas Randazzo
*Assistant Examiner* — Michael E Butler
(74) *Attorney, Agent, or Firm* — Michael Spenner; Brooks Kushman P.C.

(57) ABSTRACT

One or more embodiments include systems and methods for regulating control of a vehicle infotainment system. In one embodiment, a vehicle computing system includes a user interface which has one or more output components and one or more input components. Software executing in memory of the vehicle computing system may be programmed with rules to reduce driver distraction such as preventing inputs or outputs during vehicle operation. Inputs may be intercepted from the one or more input components of the user interface. Additionally or alternatively, outputs may be intercepted to the output components of the user interface. The intercepted inputs or intercepted outputs may be evaluated for one or more violations based on the rules. If the one or more violations are detected, the inputs or outputs may be prevented during vehicle operation.

20 Claims, 3 Drawing Sheets

(51) Int. Cl.
  *B60K 37/06* (2006.01)
  *G06F 3/0484* (2022.01)
  *G06F 3/04883* (2022.01)
  *G06F 3/0362* (2013.01)

(52) U.S. Cl.
  CPC ........ *G06F 3/0484* (2013.01); *G06F 3/04883* (2013.01); *B60K 2370/11* (2019.05); *B60K 2370/145* (2019.05); *B60K 2370/148* (2019.05); *B60K 2370/1442* (2019.05); *B60K 2370/1868* (2019.05); *B60K 2370/193* (2019.05); *B60K 2370/195* (2019.05); *B60K 2370/33* (2019.05); *B60K 2370/52* (2019.05); *B60W 2520/10* (2013.01)

(58) Field of Classification Search
  USPC ......................................................... 701/36
  See application file for complete search history.

(56) References Cited

U.S. PATENT DOCUMENTS

| | | | |
|---|---|---|---|
| 6,842,677 B2 | 1/2005 | Pathare | |
| 6,903,652 B2 | 6/2005 | Noguchi et al. | |
| 7,075,458 B2 * | 7/2006 | Dowdy | B63B 49/00 340/309.4 |
| 7,194,069 B1 | 3/2007 | Jones et al. | |
| 7,246,062 B2 | 7/2007 | Knott | |
| 7,337,113 B2 | 2/2008 | Nakagawa et al. | |
| 7,565,230 B2 | 7/2009 | Gardner et al. | |
| 7,764,189 B2 | 7/2010 | Rubins et al. | |
| 7,783,475 B2 | 8/2010 | Neuberger et al. | |
| 7,826,945 B2 | 11/2010 | Zhang et al. | |
| 7,830,271 B2 | 11/2010 | Rubins et al. | |
| 7,881,940 B2 | 2/2011 | Dusterhoff | |
| 8,116,437 B2 | 2/2012 | Stillman et al. | |
| 8,285,453 B2 | 10/2012 | Schroeder et al. | |
| 8,502,642 B2 | 8/2013 | Vitito | |
| 2003/0004730 A1 | 1/2003 | Yuschik | |
| 2003/0055643 A1 | 3/2003 | Woestemeyer et al. | |
| 2003/0009935 A1 | 5/2003 | Tanaka et al. | |
| 2003/0096593 A1 * | 5/2003 | Naboulsi | B60R 11/02 455/411 |
| 2003/0220725 A1 | 11/2003 | Harter, Jr. et al. | |
| 2004/0176906 A1 | 9/2004 | Matsubara | |
| 2004/0267534 A1 | 12/2004 | Beiermeister | |
| 2005/0125110 A1 | 6/2005 | Potter et al. | |
| 2005/0215241 A1 | 9/2005 | Okada | |
| 2006/0133099 A1 * | 6/2006 | Thannikary | B60Q 3/80 362/459 |
| 2006/0142917 A1 * | 6/2006 | Goudy | B60R 16/0231 701/45 |
| 2006/0284769 A1 * | 12/2006 | Bolduc | G01S 5/02 342/463 |
| 2007/0072616 A1 * | 3/2007 | Irani | H04M 1/66 455/441 |
| 2007/0255568 A1 | 11/2007 | Pennock | |
| 2008/0007061 A1 | 3/2008 | Yun | |
| 2009/0085728 A1 | 4/2009 | Catten et al. | |
| 2009/0195376 A1 * | 8/2009 | Miller | B60R 25/241 340/457.1 |
| 2009/0275281 A1 | 11/2009 | Rosen | |
| 2010/0191535 A1 | 7/2010 | Berry et al. | |
| 2010/0210254 A1 | 8/2010 | Kelly et al. | |
| 2010/0023395 A1 | 9/2010 | Kelly et al. | |
| 2010/0279626 A1 | 11/2010 | Bradley et al. | |
| 2011/0003587 A1 | 1/2011 | Belz | |
| 2011/0009107 A1 | 1/2011 | Guba et al. | |
| 2011/0021234 A1 | 1/2011 | Tibbitts et al. | |
| 2011/0076996 A1 | 3/2011 | Burton et al. | |
| 2011/0084852 A1 | 4/2011 | Szczerba | |
| 2011/0115616 A1 | 5/2011 | Paccar | |
| 2011/0115618 A1 | 5/2011 | Catten et al. | |
| 2011/0166748 A1 | 7/2011 | Schneider et al. | |
| 2011/0304465 A1 * | 12/2011 | Boult | B60K 28/06 340/576 |
| 2013/0274997 A1 * | 10/2013 | Chien | H04M 1/72577 701/36 |

OTHER PUBLICATIONS

Driver Focus—Telematics Working Group, Statement of Principles, Criteria and Verification Procedures on Driver Interactions with Advanced In-Vehicle Information and Communications Systems, Including 2006 Updated Sections, Jun. 26, 2006.

Ford Motor Company, "SYNC with Navigation System," Owner's Guide Supplement, SYNC System Version 1 (Jul. 2007).

Ford Motor Company, "SYNC," Owner's Guide Supplement, SYNC System Version 1 (Nov. 2007).

Ford Motor Company, "SYNC," Owner's Guide Supplement, SYNC System Version 2 (Oct. 2008).

Ford Motor Company, "SYNC with Navigation System," Owner's Guide Supplement, SYNC System Version 3 (Jul. 2009).

Ford Motor Company, "SYNC," Owner's Guide Supplement, SYNC System Version 3 (Aug. 2009).

Kermit Whitfield, "A hitchhiker's guide to the telematics ecosystem," Automotive Design & Production, Oct. 2003, http://findarticles.com, pp. 1-3.

\* cited by examiner

SYSTEMS AND METHODS FOR REGULATING CONTROL OF A VEHICLE INFOTAINMENT SYSTEM

CROSS-REFERENCE TO RELATED APPLICATION

This application is a continuation of U.S. application Ser. No. 12/857,145, filed Aug. 16, 2010, now abandoned, which application is hereby incorporated by reference in its entirety.

TECHNICAL FIELD

Various embodiments relate to the use and control of a vehicle computing system. In some embodiments, the use and control of the vehicle computing system may be regulated.

BACKGROUND

Various examples of tools for controlling vehicle infotainment use exist in the art.

U.S. Pat. No. 6,668,221 to Harter et al. ('221 Patent) is one example of such a tool. The '221 Patent discloses a user discrimination control system which controls functionality made available by a vehicle infotainment device by reducing functionality provided to the driver while allowing enhanced functionality to another passenger in the vehicle. A human machine interface located in a vehicle allows an occupant to interface with the infotainment device. A passenger detection sensor senses a condition indicative of a passenger other than the driver interfacing with the human machine interface. A video imaging system detects a driver distraction condition. A controller controls functions made available by the infotainment device by allowing one of first and second levels of functionality based on the sensed conditions.

As another example, U.S. Publication No. 2006/0142917 discloses a system which is operative to disable at least one infotainment device under certain conditions relative to the current driving environment of the user. The system uses a weighted matrix to assign risk to certain sensed conditions while driving. A changed condition is assigned a weight and the weighted risks are summed to calculate risk level information. The risk level information is thereafter compared to priority level information associated with at least one infotainment device. When the risk level information exceeds or is equal to the priority level information of the at least one infotainment device the system temporarily disables the infotainment device until the driving environment changes to a condition where it is safe to operate the infotainment device.

SUMMARY

One aspect includes a vehicle computing system. A user interface of the vehicle computing system may include one or more output components and one or more input components. Additionally, software executing in memory of the vehicle computing system may be programmed with rules to reduce driver distraction by preventing inputs or outputs during vehicle operation. The software may be configured to intercept inputs (described below) from the one or more input components of the user interface and outputs (described below) to the output components of the user interface. The intercepted inputs or intercepted outputs may be evaluated for one or more violations based on the rules. If the one or more violations are detected, the software may be further configured to prevent inputs or outputs during vehicle operation if the one or more violations are detected.

The rules may define an input count allowed during vehicle operation. Additionally or alternatively, the rules may define rules relating to outputs allowed during vehicle operation. The rules may further defined a vehicle operational status which may be based on a speed of the vehicle.

Another aspect may include a computer-implemented method for controlling operation of a vehicle computing system by a user. The method may include communicating with a device having installed software applications that execute one or more services or operations via the vehicle computing system. One or more predefined limits associated with inputs to the vehicle computer system or outputs from the vehicle computing system may be received at the vehicle computing system.

Inputs or outputs may be received at the vehicle computing system. An operational status of a vehicle may be determined including, but not limited to, the speed of the vehicle. Further, a determination may be made if the inputs or outputs are limited based on the vehicle operational status. If limited, the predefined limits may be executed and communication with the software applications upon executing the one or more predefined limits may be prevented. Further, a violation notification message may be transmitted.

Another aspect includes a computer-program product embodied in a computer readable medium having instructions for receiving inputs from an input device on a vehicle computer or outputs for output from the vehicle computer. Further instructions may include rules for reducing driver distraction defining an input/output count permitted during vehicle operation. The inputs or outputs may be counted for detecting a rule violation. Upon detecting the violation, the computer-program product may include instructions for preventing the inputs and outputs.

In some embodiments, the input/output count permitted during vehicle operation may be reset after a period of inactivity.

In further embodiments, a rule violation may be detected based on a count of two or more inputs or outputs.

In yet further embodiments, before counting the inputs or outputs, a count value may be calculated for when inputs or outputs will be prevented. The inputs or outputs may then be prevented when the count value is reached.

These and other aspects will be better understood in view of the attached drawings and following detailed description of the invention.

BRIEF DESCRIPTION OF THE DRAWINGS

The figures identified below are illustrative of some embodiments of the invention. The figures are not intended to be limiting of the invention recited in the appended claims. The embodiments, both as to their organization and manner of operation, together with further object and advantages thereof, may best be understood with reference to the following description, taken in connection with the accompanying drawings, in which:

DETAILED DESCRIPTION

Detailed embodiments of the invention are disclosed herein. However, it is to be understood that the disclosed embodiments are merely exemplary of an invention that may be embodied in various and alternative forms. Therefore, specific functional details disclosed herein are not to be interpreted as limiting, but merely as a representative basis for the claims and/or as a representative basis for teaching one skilled in the art to variously employ the present invention.

Automotive OEM's use guidelines in vehicle manufacturing as defined by various governmental and independent automotive organizations. These guidelines are developed for every facet of vehicle manufacturing, including the manufacturing of in-vehicle information and communication systems. Organizations such as the Alliance of Automobile Manufacturers (AAM) are responsible for drafting these guidelines and overseeing that telematics systems comply with these guidelines. As an example, the guidelines state that a vehicle driver (i.e., user of the telematics systems) should not have his or her eyes off the road for more than a certain amount of time while driving. Another guideline states that a user should not be operating the system for longer than a particular period of time. Another guideline relates to the sound volume output from the system.

To add to the complexity, telematics systems, such as SYNC from THE FORD MOTOR COMPANY, permit various parties to develop applications that can be used by a user via the in-vehicle information and communication system. As an example, these applications may be installed and run on a mobile device (such as a cellphone), but operation of these applications may be accomplished through the in-vehicle communication and information system. As such, the use of these applications must still comply with the guidelines set by the AAM. Requiring such developers to program applications that comply with these guidelines, however, may be expensive and a deterrent based on the number of limitations.

As such, OEMs should be able to develop features in a vehicle information and communication system that allow a user to operate the system and applications while complying with the guidelines.

Figure 1:
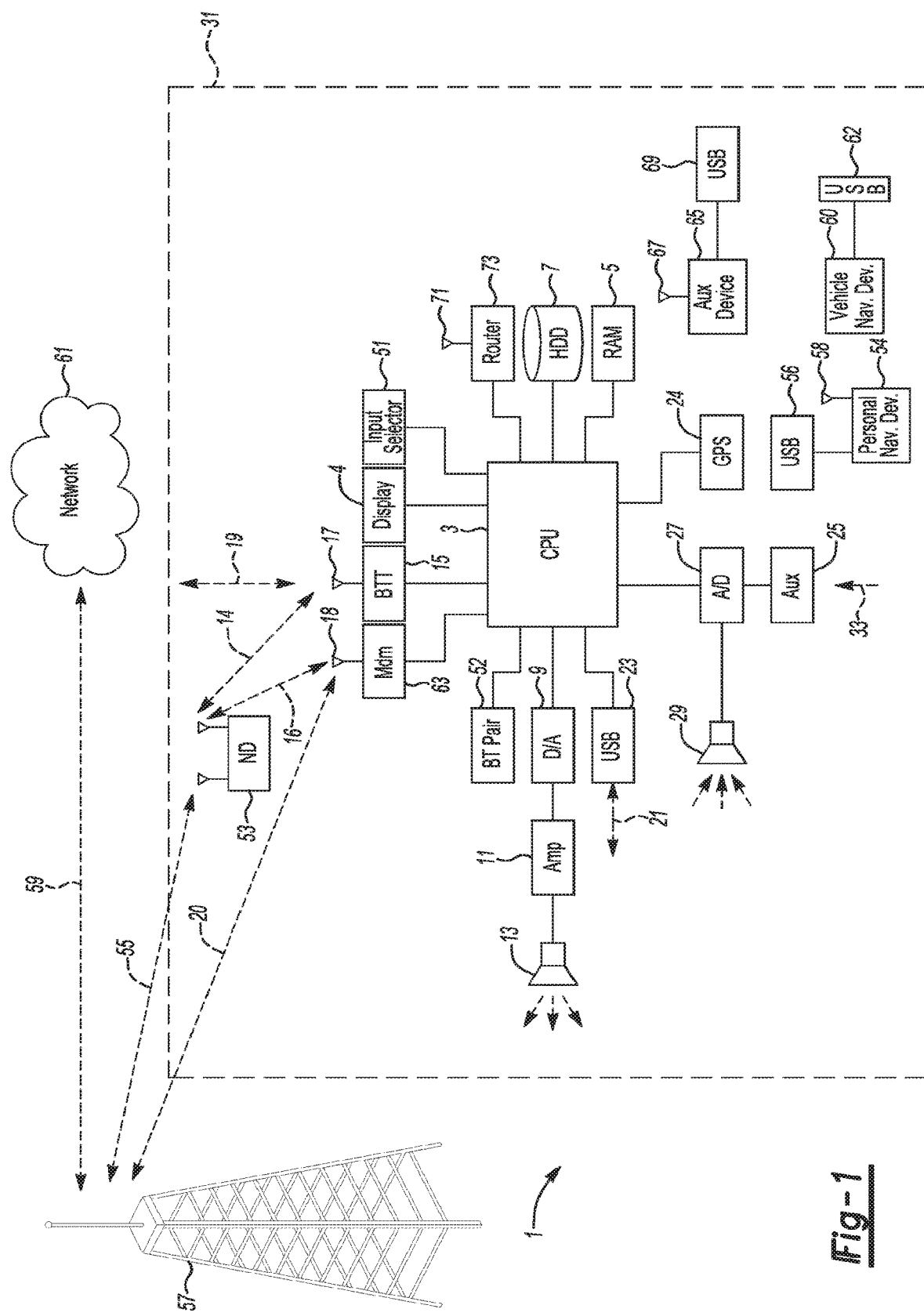
FIG. 1 is a block topology of a vehicle computing system having dynamic VCS controls.

FIG. 1 illustrates an example block topology for a vehicle based computing system 1 for a vehicle 31. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, audible speech and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory.

The processor is also provided with a number of different inputs allowing the user to interface with the processor. In this illustrative embodiment, a microphone 29, an auxiliary input 25 (for input 33), a USB input 23, a GPS input 24 and a BLUETOOTH input 15 are all provided. An input selector 51 is also provided, to allow a user to swap between various inputs. Input to both the microphone and the auxiliary connector is converted from analog to digital by a converter 27 before being passed to the processor.

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, etc.). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH Trasceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device).

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example).

If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11 g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58; or a vehicle navigation device 60, having a USB 62 or other connection, an onboard GPS device 24, or remote navigation system (not shown) having connectivity to network 61.

Further, the CPU could be in communication with a variety of other auxiliary devices 65. These devices can be connected through a wireless 67 or wired 69 connection. Also, or alternatively, the CPU could be connected to a vehicle based wireless router 73, using for example a WiFi 71 transceiver. This could allow the CPU to connect to remote networks in range of the local router 73.

Regulating VCS 1 control during a vehicle drive may be accomplished through instructions programmed to the CPU 3. In one embodiment, the programmed instructions 71 may be software installed to the CPU 3 and/or embedded in firmware (hereinafter referred to as "software").

Figure 2:
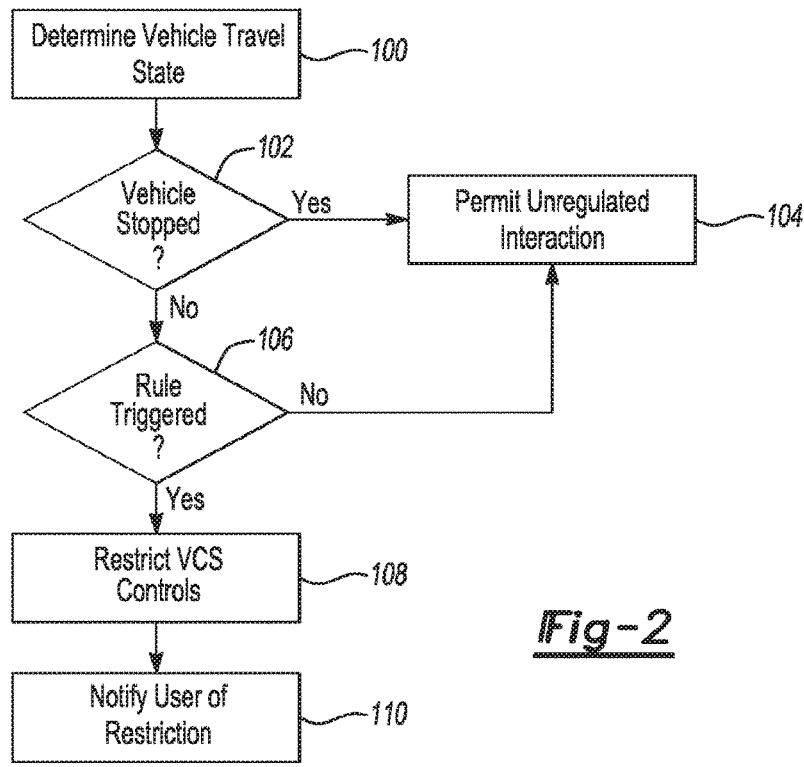
FIG. 2 illustrates the operation for regulating control from the vehicle computing system of FIG. 1.

FIG. 2 illustrates a non-limiting process for determining whether VCS 1 control should be regulated. One or more rules may define the parameters of regulating a user's control of the VCS 1 when interacting with one or more service(s) of, or through, the VCS 1. In one embodiment, these rules may be activated during a vehicle drive. Further, in some embodiments, these rules may pertain to the interaction through a VCS menu. Thus, when one or more rules are violated (as described below), control of the VCS menu may be locked. It will be appreciated that a user may be a driver of a vehicle and, in some embodiments, any other occupant in the vehicle.

Figure 3:
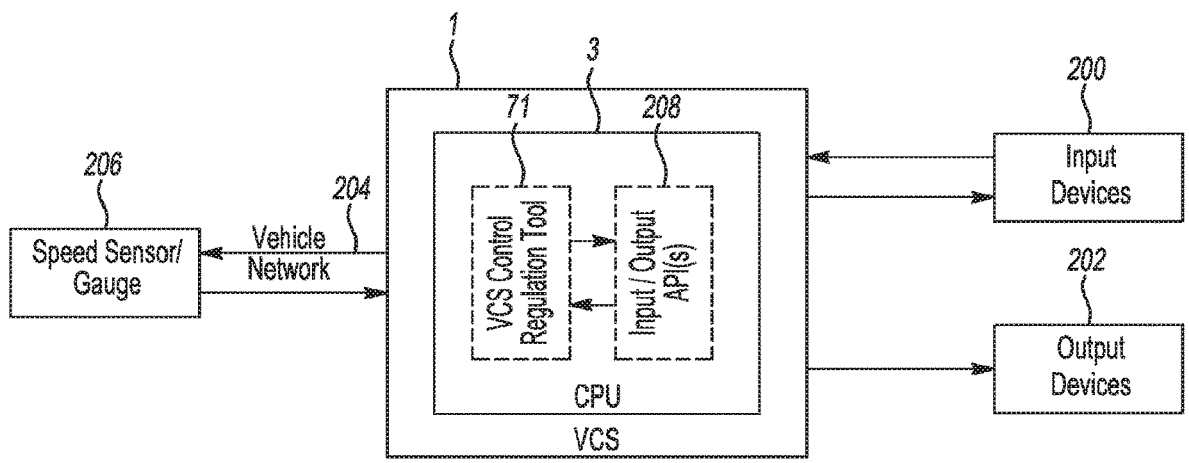
FIG. 3 is a block diagram illustrating the interaction between the vehicle and a tool for regulating control of the vehicle computing system of FIG. 1.

FIG. 2 will be described with respect to FIG. 3 which is a block topology illustrating the logical interaction between the vehicle and software 71. A vehicle operational status may be determined based on one or more signals transmitted from a speed sensor or gauge 206 in the vehicle via a vehicle network 204 (block 100). An application programming interface (API) or some other tool may be utilized to interface between the speed sensor 206 and the software 71. Alternatively or additionally, the software 71 may be programmed to read and implement data from the vehicle sensor(s) 206.

Based on the communication with the speed sensor(s) 206, it may be determined if the vehicle is in a stop state (block 102). A stop state may include, but is not limited to, the vehicle being powered off, the vehicle running, but in park, or the vehicle moving below a predetermined speed threshold. This latter stop state may include a vehicle sitting idle, but not in park. If the vehicle is in a stop state, a user may be permitted to engage in unregulated interaction with the VCS 1 (block 104).

Non-limiting examples of interactions are described below with respect to FIGS. 4 and 5. Generally, an interaction may include use of input devices 200 and/or responses, commands, and/or instructions received via output devices 202 of the VCS 1. Input devices 200 and output devices 202 are generally illustrated in FIG. 3 for purposes of explanation and to avoid redundancy. It will be understood, however, that input devices 200 and output devices 202 include, but are not limited to, input/output devices described in FIG. 1.

While the figures are illustrated and described with respect to interactions via a vehicle computing system, it will appreciated that the illustrations and associated descriptions may also be applied in the context of user interaction via a device in the vehicle (including, but not limited to, ND 53 or another device communicating with the vehicle). In this context, a user's interaction with the VCS 1, the device, or both may be controlled (as described below).

If the vehicle is not in a stop state, a further determination may be made whether rules for regulating VCS control are triggered (block 106). Said another way, a determination may be made if the user interaction rules are violated. These rules may relate to the vehicle speed. For example, user interaction with the VCS 1 may be unregulated when the vehicle speed is under a predetermined speed threshold (i.e., the speed rule is not triggered or violated). In one embodiment, this rule may define the predetermined speed threshold as any speed at or under 10 MPH. In another embodiment, the predetermined threshold may be a speed in the range of 2-5 MPH. Thus, if the vehicle speed remains under the predetermined threshold, unregulated interaction may be permitted (block 104).

The rules may be based on additional or alternative criteria. As a non-limiting example, the rules may be based on cognitive load on the user. Cognitive load refers to the demand or load that a stimulus places on a human mind during user interaction with the stimulus. In this scenario, VCS 1 may include programmed rules for determining the cognitive load on the user when interacting with the VCS 1 to prevent a cognitive overload. The programmed rules may be programmed to software 71 or other software installed on the VCS 1 (not shown). As one non-limiting example, it may be determined whether text or graphics displayed to a user may result in a cognitive overload. As another non-limiting example, it may be determined if interaction with the VCS 1 may require the user to input too many responses and/or commands within a short period of time. As another example, it may be determined if the user is presented with too many options for inputs. For example, and without limitation, a user is presented with 25 input options on a display. As another example, a user is presented with 10 voice input options. It will be appreciated that these examples are for illustration purposes only and the number of inputs may vary without departing from the scope and spirit of the invention.

The cognitive load rules may include types of information which may cause a cognitive overload. The rules may additionally or alternatively be based on predetermined thresholds (i.e., measurable values associated with a cognitive overload). It will be appreciated that other rules may determine the cognitive load without departing from the scope of the various embodiments and that the rules provided are non-limiting.

One illustrative, non-limiting example of a cognitive load rule may include limiting the display of flashing and/or scrolling text on the VCS display 4. These rules may include displaying similar text in quick succession. As another non-limiting example, these rules may also include displaying information at predetermined intervals. The intervals may be less than three second intervals. As another example, a string matching algorithm may be used to present text as represented by the following example using the phrase "This is scrolling." Each line represents the text that may be displayed:

(1) "This is scrollin"
(2) "his is scrolling"
(3) "is is scrolling"
(4) "s is scrolling t"

In another non-limiting example, the rules may relate to VCS 1 controls including, but not limited to, rotary dials or button presses. The rules may limit the number of button presses or "clicks" of the rotary dial during use of the VCS 1. In one embodiment, the rules may be based on a period of time (e.g., and without limitation, the number of button presses or "clicks" within a specific timeframe). The period of time may include, but is not limited to, seconds and minutes. As a non-limiting example, the software 71 may set the number of rotary "clicks" to ten "clicks." Thus, a user who is trying to access a feature via the VCS 1 will be locked out from accessing those features which require more than 10 "clicks" to be accessed. It will be appreciated that the "clicks" may be calculated or counted when the dial is moved forward, backward, or both.

As another non-limiting example, user interaction through voice responses may be regulated. The cognitive load rule may state a predetermined number of responses that the user may input via voice during a single voice recognition (VR) session. In some embodiments, the number of responses may be limited to three. By limiting the number of responses that the user may input via voice, the user is not overwhelmed with a rapid succession of required responses.

A voice recognition session may be defined by a period of time, a stop and drive event (where a stop begins a new session), an application reset event (i.e., reactivating the application), or an application change event (e.g., starting a new application creates a new session). It will be appreciated that other events may define a VR session without departing from the scope of the invention.

As an additional, non-limiting example, the vehicle's audio may also be regulated. For instance, and without limitation, audible spikes may be controlled. As such, the volume level of the VCS 1 may be monitored and counted/measured for sudden increases in volume. In one embodiment, decibel levels may be counted.

As another non-limiting example, the cognitive rules may relate to the human machine interface (HMI) of the VCS 1. The rules may relate to the display of graphics and/or text on the HMI. The rules may also relate to the ability to interact with the HMI (e.g., and without limitation, through a touchscreen display). In one non-limiting instance, the rules may be tied to vehicle travel (as described above). Accordingly, if the vehicle is in motion, graphics and/or text may not be displayed. Additionally or alternatively, the user may not interact with the touchscreen display such that all features may be blacked out.

In another non-limiting instance, the graphics/text may not be displayed if the graphics/text use more than a predetermined amount of memory to load to the display 4. Alternatively or additionally, the graphics/text may not be displayed if the data to be displayed is larger than a predetermined amount. Alternatively or additionally, the display of text may be based on a predetermined number of words and/or characters to display to a user. If the content exceeds the predetermined number of words and/or characters, the content may not be displayed.

In another non-limiting instance, the rules may set a predetermined number of times that the user interacts with the HMI. For example, and without limitation, the number of times the user touches the display and enters a response and/or command may be counted. If the count exceeds a predetermined threshold (e.g, and without limitation, 10 touches), the HMI may be locked. In one embodiment, the threshold for touches may be delimited by the HMI session. An HMI session may be defined by a period of time, a stop and drive event (where a stop begins a new session), an application reset event (i.e., reactivating the application), or an application change event (e.g., starting a new application creates a new session). It will be appreciated that other events may define an HMI session without departing from the scope of the invention.

In one embodiment, a rule violation determination may be made if and when the violation occurs. As an example, the violation may not be determined until the threshold is exceeded. In other embodiments, a determination of whether a violation will occur may be based on the user's request. As an example, if the threshold is ten "clicks," the VCS 1 may calculate or count at which point the user's interaction exceeds more than 10 "clicks" and blocks those features exceeding the count. Thus, the user may access those features under 10 "clicks."

In additional embodiments, the cognitive load determinations may be accomplished through artificial intelligence software. As such, the cognitive load rules may be incorporated in artificial intelligence (AI) software installed on the VCS 1. The AI software may or may not operate in cooperation with the instructions for regulating VCS control. Thus, as one example, the artificial intelligence software may predict whether a user interaction violates a rule based on past responses (i.e., historical interactions). As a non-limiting example, if in previous interactions the user could only interact with the VCS 1 by violating a rule (e.g., and without limitation, exceeding more than the predetermined number of clicks and/or touches) and/or the graphics to be displayed were previously determined to violate a rule, then control of the VCS 1 may be regulated.

It will be appreciated that regulating VCS control may occur at any point in the interaction with the VCS 1. Thus, the determination of whether a rule is violated (e.g., and without limitation, based on count and/or speed threshold exceeded) may occur whether the user is at the beginning, middle, or end of a VCS menu. It will also be appreciated that control of the VCS may be blocked if a plurality of rules are violated. As a non-limiting example, an interaction may violate a rule if the number of "clicks" and touches together exceed 10 counts. It will be appreciated that any combination of rules may be used.

In some embodiments, instructions for regulating VCS control may be transmitted when either granting or denying such permissions. As a non-limiting example, the vehicle operational status may serve as a trigger for transmitting the software 71 instructions. Upon receipt by the software 71 of the vehicle operational status, the instructions may be transmitted and the input/output devices 200, 202 may respond based on the instructions received.

In other embodiments, the software 71 may be default programmed to transmit instructions denying such permissions. As such, input devices 200 and/or output device 202 may be programmed to remain unlocked for user interaction, unless instructions denying permission are otherwise received by device 200, 202.

Referring back to FIGS. 2 and 3, the CPU 3 may also have installed application programming interface(s) (APIs) 208 for interacting with the inputs/outputs of the VCS. These APIs may be installed as communication interfaces with the input/output device 200, 202. The APIs, however, may or may not include rules for regulating VCS control. If a rule is triggered/violated (block 106), VCS control may be limited (block 108). The limitation instruction(s)/command (s) may be transmitted via the API 208. It will be appreciated that the terms limited and/or limitation may also refer to VCS control being restricted.

In one embodiment, when control is limited, the user may be notified of the restriction (block 110). The notification may be audible, textual, graphical, and other suitable notifications. In one embodiment, a speech based notification may be provided to the user such as "this feature is not accessible while driving." It will be appreciated that the speech-based notification is an example and other such notifications may be provided without departing from the scope and spirit of the invention.

Figure 4:
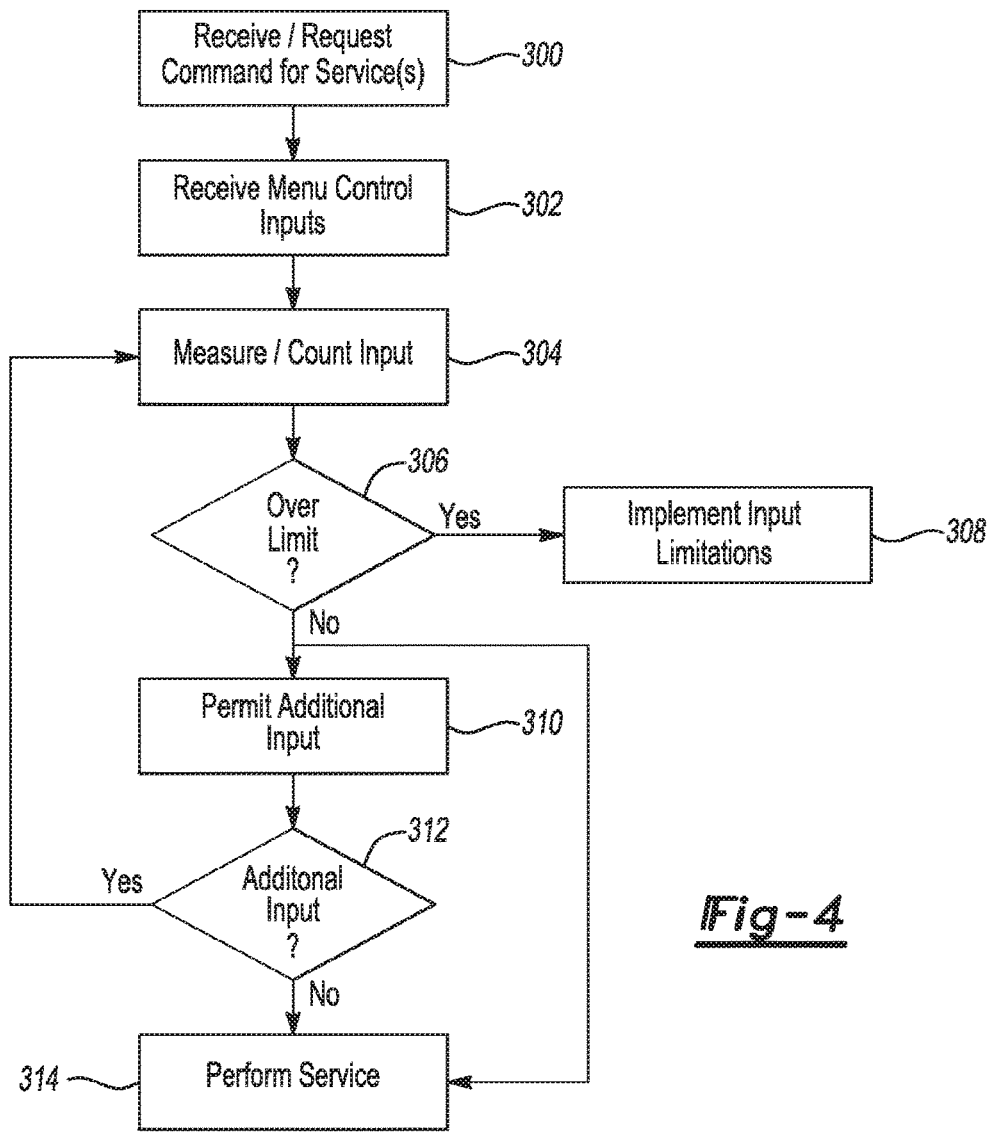
FIG. 4 illustrates a non-limiting method for regulating input control from the vehicle computing system of FIG. 1.

FIG. 4 illustrates the operation for determining if user input to the VCS 1 triggers/violates one or more rules. User input may be accomplished through one or more button presses, voice inputs, operation of rotary dials, touchscreen inputs, capacitive inputs, and the like. The user input may be received in order to interact with one or more services through the VCS 1.

In some embodiments, the control restrictions may exclude input(s) received for executing a command. The following in a non-limiting example: A user is controlling the VCS 1 in order to access a particular song. In order to do so, the user rotates the rotary dial through two menu options until the "media" menu option is reached. The user then presses a button to enter the "media" menu. Once in the "media" menu, the user may again rotate the rotary dial and press a button to select "music." This may continue until the user finds the song desired to be played. In this example, the button press to execute each request/command may be excluded from the input count.

In other embodiments, each input (whether to execute a command or not) is counted as part of the limit. In yet further embodiments, each execution of a command may restart the counter for determining whether a limit has been exceeded. Thus, in the example provided above, assuming that the number of "clicks" is set to ten, after the user enters the "media" menu, the user should reach the "music" menu within 10 "clicks" (i.e., rather than 8 "clicks"). In further embodiments, the counter may be restarted after a period of inactivity (between inputs).

It will be appreciated that the above example may be an illustration for any input and that the use of the rotary dial is for illustration purposes.

The services may comprise device based services and/or cloud based services (i.e., software as a service)). Non-limiting and non-exhaustive examples of such services may include communication services (e.g., and without limitation, electronic mail, SMS messaging, text messaging, VOIP, and the like), social networking services, diagnostic services, media services (e.g., and without limitation, Internet radio), information-based services (e.g., and without limitation, news and sports), location-based services (e.g., and without limitation, navigation) and phone services (e.g., and without limitation, access to address book, access to a calendar, and the like).

A request/command for one or more service(s) may be received by the VCS 1 from a user (block 300). When the service(s) are activated, one or more inputs may be received at the VCS 1 (block 302). Non-limited examples of such inputs are described above. The input(s) received may be measured and/or counted (block 304). Additionally or alternatively, the input(s) may be measured/counted against the predefined limit.

A determination may be made whether the input(s) exceed the predefined limit (block 306). If so, the input restrictions may be implemented (block 308). A user may regain access after a counter restart (e.g., based on a lapse of time or other event). A user may additionally or alternatively regain access by bringing the vehicle to a rest position (e.g., sitting idle or putting the vehicle in park). If the input(s) do not exceed the predefined limit, the services requested may be performed (block 314).

In one embodiment, if the input(s) are not over the limit, additional input(s) may be permitted (block 310). If additional inputs are received (block 312), the input(s) may be measured/counted (block 304) and the process may continue in the same fashion as described above. If no additional inputs are received, the services may performed (block 314).

Figure 5:
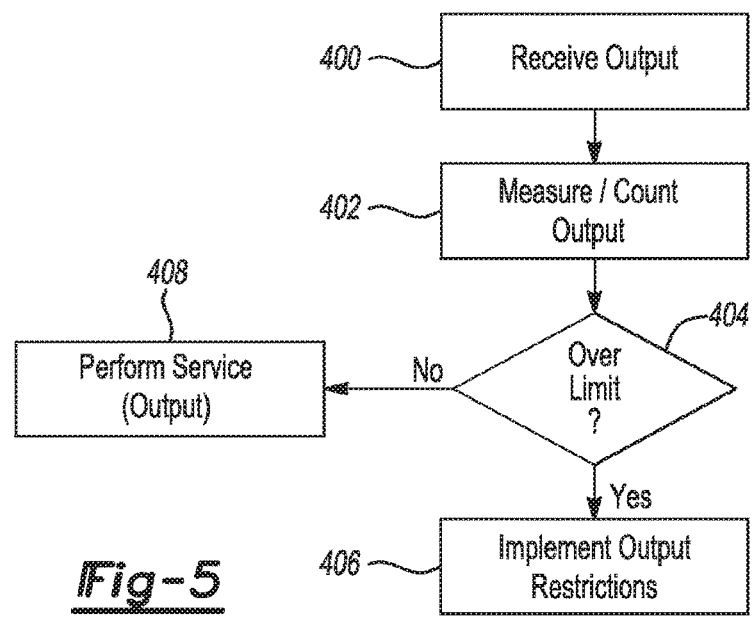
FIG. 5 illustrates a method for regulating the use of output components of the vehicle computing system of FIG. 1.

FIG. 5 illustrates the process for determining if an output triggers/violates one or more rules. As illustrated in block 400, the output may be received. Non-limiting and non-exhaustive examples of outputs are described above. The output may be measured and/or counted (block 402). Additionally or alternatively, the output may be measured/counted against the predefined limit.

A determination may be made if output exceeds a predefined limit (block 404). If the limit is exceeded, the output restrictions may be implemented (block 406). If the limit is not exceeded, the service (e.g., display of graphics/text, voice prompts, audio, etc.) may be performed (block 408).

While exemplary embodiments are illustrated and described above, it is not intended that these embodiments illustrate and describe all possibilities. Rather, the words used in the specification are words of description rather than limitation, and it is understood that various changes may be made without departing from the spirit and scope of the invention.

What is claimed is:

1. A system comprising:
   a processor configured to:
   impose a control interaction count threshold and predefined session duration, responsive to a determination that a driver cognitive load meets a predefined level for limiting user interaction with a predesignated vehicle control; and
   disable the vehicle control for the remainder of the session duration, responsive to a count of user interactions with the predesignated vehicle control exceeding the threshold during the session duration.

2. The system of claim 1, wherein the vehicle control includes a vehicle touch screen interface.

3. The system of claim 1, wherein the vehicle control includes a vehicle switch.

4. The system of claim 1, wherein the vehicle control includes a vehicle dial.

5. The system of claim 1, wherein the vehicle control includes a vehicle button.

6. The system of claim 1, wherein the session duration persists until a vehicle is powered off.

7. The system of claim 1, wherein the session duration persists until a predefined period of inactivity with regards to control interaction occurs.

8. The system of claim 1, wherein the session duration persists until a vehicle including the vehicle control stops moving.

9. The system of claim 1, wherein the processor is configured to impose the control interaction count threshold and predefined session duration separately for each of a plurality of consecutively executing applications, such that each of the executing applications has an independent count threshold for a control corresponding to the application and an independent session duration.

10. A system comprising:
a processor configured to:
determine that a driver cognitive load meets a predefined level for limiting vehicle control interaction, wherein the vehicle control provides control over an application having at least two aspects that utilize different numbers of control actuations for execution; and
block application aspects requiring more than a threshold number of control actuations, based on a predefined number of control actuations associated with each aspect being higher than the threshold.

11. The system of claim 10, wherein the vehicle control includes a vehicle touch screen interface.

12. The system of claim 10, wherein the vehicle control includes a vehicle switch.

13. The system of claim 10, wherein the vehicle control includes a vehicle dial.

14. The system of claim 10, wherein the vehicle control includes a vehicle button.

15. The system of claim 10, wherein the processor is configured to block the application aspects for a predetermined duration.

16. The system of claim 15, wherein the predetermined duration persists until a vehicle is powered off.

17. The system of claim 15, wherein the predetermined duration persists until a vehicle including the vehicle control stops moving.

18. The system of claim 10, wherein the predefined number of control actuations is based on a minimum number of control actuations required to execute a given application aspect.

19. The system of claim 10, wherein the t predefined number of control actuations is based on stored data indicating a count of user interactions previously observed with regards to execution of a given application aspect.

20. A computer-implemented method comprising:
blocking access to a vehicle application aspect utilizing more than a threshold number of control interactions to execute, determined based on stored, observed user behavior with regards to a number of control interactions previously used to execute the application aspect, the blocking responsive to determining that a user cognitive load exceeds a predefined threshold.

* * * * *